United States Patent [19]    [11] Patent Number: 4,712,191
Penna                            [45] Date of Patent:   Dec. 8, 1987

[54] DISPLAY SYSTEM WITH NESTED INFORMATION DISPLAY

[75] Inventor: David E. Penna, Redhill, England

[73] Assignee: U.S. Philips Corporation, New York, N.Y.

[21] Appl. No.: 516,020

[22] Filed: Jul. 22, 1983

[30] Foreign Application Priority Data

Aug. 11, 1982 [GB] United Kingdom ............... 8223085

[51] Int. Cl.⁴ .................. G06F 3/14; G06F 15/40; G06G 1/06
[52] U.S. Cl. .................. 364/900; 364/521; 340/712; 340/721
[58] Field of Search ... 364/200 MS File, 900 MS File, 364/521, 518; 340/709, 712, 721, 724, 365 VL

[56] References Cited
U.S. PATENT DOCUMENTS 3,771,156 11/1973 Watts et al. ............... 340/365 VL
4,001,807  1/1977 Dallimonti ............... 340/722 X
4,202,041  5/1980 Kaplow et al. ............ 364/900
4,366,475 12/1982 Kishi et al. ............... 364/521
4,431,870  2/1984 May et al. ............... 340/712 X
4,481,603 11/1984 McCaskill et al. ......... 364/900
4,516,156  5/1985 Fabris et al. ............. 340/712 X
4,521,870  6/1985 Babbel et al. ............ 364/900

Primary Examiner—Raulfe B. Zache
Assistant Examiner—Thomas C. Lee
Attorney, Agent, or Firm—Robert T. Mayer; Bernard Franzblau

[57] ABSTRACT

An information display system which can produce an information display (e.g. on a television monitor) from any one of a plurality of different information sources. The information sources are associated with different facilities such as teletext and viewdata. In order to obtain information from a particular information source, the associated facility option is selected from the available facility options by selecting from the television screen "nested" areas which pertain to one or more facility options. The selection can be effected using a touch-sensitive screen which overlies the television screen. The selection process may comprise the display of a number of successive display frames containing "nested" areas. The selection of an area in one frame produces a fresh display frame which redefines areas which are nested within the selected area.

13 Claims, 6 Drawing Figures

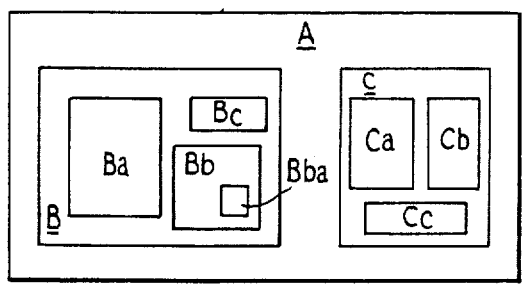
FIG. 2
FIG. 3
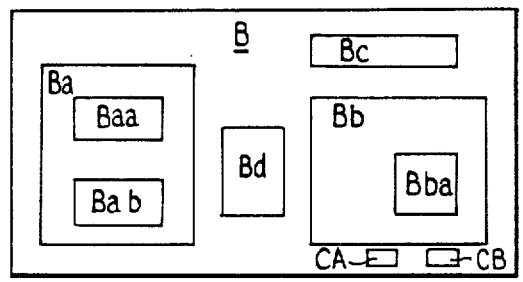
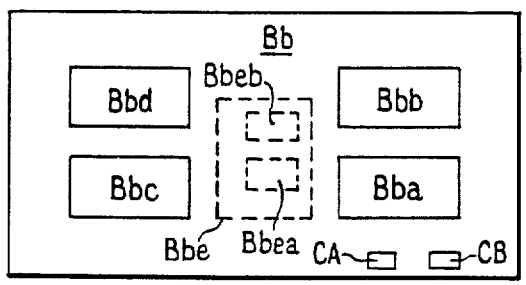
FIG. 4
FIG. 5
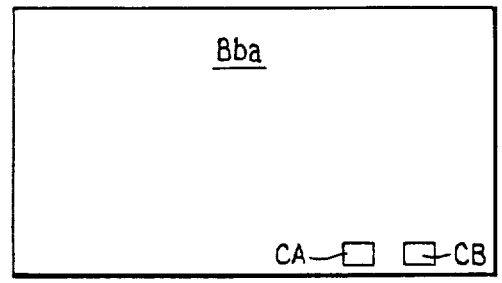

DISPLAY SYSTEM WITH NESTED INFORMATION DISPLAY

This invention relates to an information display system of a character which can establish selective connection to a number of different information sources to obtain information therefrom for display on a suitable display device. A particular one of said sources from which information is to be obtained at any time is determined by the central processor means of the system as a result of the selection of one of a plurality of facility options which pertain respectively to said information sources and which are selectable from interface apparatus by which the central processor means can be accessed.

As presently envisaged, the display device of an information display system of the above character would be a television monitor, but with the current advances in technology the possibility does exist for the display device to be of some other form, for instance a liquid crystal display device.

For establishing the selective connection to different information sources, an information display system of the above character can have a variety of connection means such as a teletext input for receiving television broadcast CEEFAX and ORACLE information, and a viewdata link to a telephone line for access to external data-bases, such as the British Post Office PRESTEL service. Each of these facility options has its own information source and can be selected by the central processor means to obtain information from that source for display. Other facility options are, for instance, program software for video games, video art and calculator or computer activities. Information sources, both temporary and permanent, pertaining to such other facility options can be provided by a internal memory of the system.

An information display system of the above character can have its central processor means arranged to function in accordance with a so-called "tree-structured" selection technique for selecting a facility option from a range of options which are available. For this selection technique, the facility options would be divided into groups, any one of which would be selectable by a first accessing operation performed with the interface apparatus. As a result of this selection, a plurality of individual facility options, or possibly a plurality of sub-groups, of the selected group would then be made available for the selection of one of these options or subgroups by a second accessing operation performed with the interface apparatus. Thereafter, in the case of subgroup selection, there would be further sub-division by further accessing operations until the required facility option is reached. For each accessing operation, there is provided a display of the facility operations which are available for selection by the accessing operation.

A difficulty that has arisen with the "tree-structured" selection technique is a tendency for a user to get "lost" in the structure. For instance, a user may not be clear as to how a current point in a selection process being performed has been reached, or what will be the consequences of selecting any of the options now available at that point. If a keyboard is used as the interface apparatus, further difficulties can arise in the association of number shown against available options displayed, with positions on the keyboard, particularly if an unskilled user is using a complex keyboard.

One proposal for simplifying the implementation of the "tree-structured" selection technique is to provide a keyboard with dedicated function keys which pertain respectively to various facility options. Such dedicated function keys can be identified by having on them a diagrammatic representation of the facility options to which they pertain.

The present invention provides an alternative proposal for implementing a facility option selection technique. This alternative proposal affords the advantage that, by combining both the display and the selection of the facility options into a single concept, it achieves greater simplicity than hitherto.

According to the invention, there is provided an information display system having connection means for establishing selective connection to a number of different information sources to obtain information therefrom for display on the screen of a display device, a particular one of said information sources from which information is to be obtained at any time being determined by central processor means of the system as a result of the selection of one of a plurality of facility options which pertain respectively to said information sources and which are selectable from interface apparatus by which the central processor means can be accessed, in which information display system the interface apparatus is operable to generate signals to represent any selected point on the screen of the display device, and the central processor means includes logic control means for producing on the screen of the display device a display frame of available facility options, and which information display system is characterised in that in respect of the selection of a facility option the logic control means is operable to produce a first display frame defining at least two discrete areas which are identified as pertaining to different facility options, said first display frame further defining within at least one of said discrete areas at least one discrete sub-area which is identified as pertaining to one or more facility options, the logic control means being further operable in response to the selection by said interface apparatus of a point which is in one of said areas but not within a sub-area of that area, or which is in a sub-area, to produce a second display frame which, if said area or sub-area pertains to a single facility option, gives a visual indication of the selection of that facility option, said logic control means then causing said connection means to establish connection to the appertaining information source.

In carrying out the invention, the logic control means can be still further operable, when in said first display frame a selected area containing sub-areas pertains to a plurality of facility options, to produce an alternative second display frame which redefines each sub-area of the selected area as a respective area which is identified as pertaining to at least one facility option. The logic control means can also be still further operable such that said alternative second display frame includes at least one further area which is identified as pertaining to at least one facility option. In said alternative second display frame at least one of said areas can have defined within it at least one sub-area which is identified as pertaining to at least one facility option.

Alteratively, in carrying out the invention, the logic control means can be still further operable, when in said first display frame a selected sub-area pertains to a plurality of facility options, to produce a different alternative second display frame which defines a plurality of areas which pertain to respective facility options or to respective pluralities of facility options. The logic control means can then also be still further operable such that at least one of the areas which pertains to a plurality of facility options has defined within it at least one sub-area which pertains to a single facility option, or to a plurality of related facility options.

An information display system according to the invention thus provides in at least one display frame a "nested" display of facility options which are available for selection. Depending on how many facility options are provided, the logic control means can provide a series of display frames to progressively reduce the number of facility options which are available for selection from successive display frames in a given hierarchial descending order. Each display frame only shows those facility options which are available for selection. Therefore, facility options which are not applicable cannot be selected erroneously because they simply are not displayed. Single facility options which are likely to be required frequently can be allocated respective sub-areas (which can themselves be within a sub-area) in one or more of the display frames so that they can be selected directly from any such display frame without having to progress through a number of display frames.

The interface apparatus may be a touch sensitive screen device, a light pen or an electronic writing tablet, for generating co-ordinate signals to represent the co-ordinates of any selected point, and thus the point itself, on the screen of the display device. Each of these forms of interface apparatus is known in the art. An example of a touch sensitive screen device is given in U.K. Patent Specification No. 1,528,581.

In carrying out the invention, the logic control means may be arranged to drive a video signal generator which provides video display signals such that the various areas and sub-areas of the display frames are made distinctive in colour and/or shape and/or size. The video display signals can also provide, as part of each display frame, wording or graphics symbols indicative of the facility option(s) to which each area or sub-area of the display frame pertains.

In further considering the nature of the invention reference will now be made by way of example to the accompanying drawings, in which:

FIGS. 2 to 5 illustrate respective display frames from which facility options afforded by the system of FIG. 1 can be selected.

Figure 1:
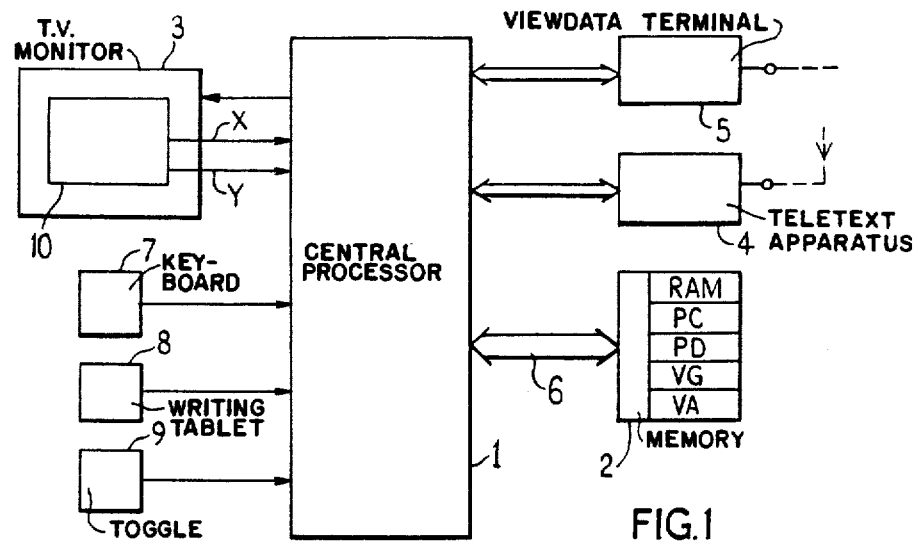
FIG. 1 shows diagrammatically an information display system with access to a number of different information sources.

Referring to the drawings, the information display system shown in FIG. 1 comprises a central processor 1, an internal memory 2, a television monitor 3, a teletext input apparatus 4 and a viewdata terminal apparatus 5. The teletext input apparatus 4 gives access to broadcast television services for teletext facility options such as CEEFAX and ORACLE, and the viewdata terminal apparatus 5 provides a link to a telephone line for access to external data-bases for viewdata facility options such as PRESTEL. The internal memory 2 is accessed by the central processor 1 over a address/data bus 6 and stores data and program software for further facility options such as a personal diary, a personal computer, video games and video art in respective memory portions PD, PC, VG and VA. The internal memory 2 also includes a general memory portion RAM for storing, as required, information relating to the various facility options. In the use of the system, control of the central processor 1 in respect of any facility option which has been selected can be effected by an appropriate interface apparatus, of which there are provided a keyboard 7, a writing tablet 8 and a toggle or roller-ball 9.

The television monitor 3 has associated with it a touch sensitive screen device 10 having a touch-sensitive transparent screen which overlies the screen of the television monitor 3. This device 10 is not otherwise illustrated, but it can take any suitable known form When the transparent screen is touched at any point, the device 10 generates co-ordinate signals on leads X and Y to represent that point and thus the corresponding point on the screen of the television monitor 3.

The touch sensitive screen device 10 constitutes a further interface apparatus by which the central processor 1 can be accessed to select any of the available facility options afforded by the system. The mode of selection for selecting a facility option from those which are available involves interaction between the central processor 1 and a user of the device 10. In general, the system provides on the screen of the television monitor 3 an initial display frame which illustrates by a combination of graphics and text in discrete areas the range of facility options which are available. A selection is made by a user touching the screen at any point within an area and the co-ordinate signals for the point are fed to the central processor 1 on the leads X and Y as selection information identifying that area within which the point lies. The central processor 1 responds to this selection information either to produce a fresh display frame which contains areas for a further selection to be made, or to produce a final display frame signifying that a specific facility option has been selected, as the case may be.

An example of a range of possible available facility options and a specific selection process for selecting one of these options will now be considered with reference to FIGS. 2 to 5. For this example an initial display frame which the system provides on the screen of the television monitor 3 when the system is brought into use is the display frame illustrated in FIG. 2. This display frame has a background A within which are located two areas B and C. The area B relates to a group of information facility options, and the area C relates to a group of service facility options, which the system can provide. All the information and service facility options in these two groups, for the example being considered, are listed in the following Table I.

TABLE I

| (Area B) Information facility options | (Area C) Service facility options |
|---|---|
| Teletext - CEEFAX service | Personal computer |
| Teletext - ORACLE service | Video games |
| Viewdata - PRESTEL service | Video art |
| Viewdata - other data base(s) | Time alarm clock |
| Personal Diary | |
| Personal information in RAM | |

Three sub-areas Ba, Bb and Bc are nested in the area B. The sub-area Ba relates to a sub-group of facility options which comprises the two (or more) viewdata services, the sub-area Bb relates to a sub-group of facility options for the personal diary and the sub-area Bc relates to a sub-group of facility options which comprises the two teletext service. Similarly, three sub-areas Ca, Cb and Cc are nested in the area C. The sub-area Ca relates to a sub-group of facility options for the personal computer, the sub-area Cb relates to a sub-group of facility options which comprise different video games, and the sub-area Cc relates to a sub-group of facility options for video art.

As aforesaid, a selection of an area (or sub-area) can be made by touching the touch sensitive screen device 10 at any point within the area (or sub-area), and the central processor 1 will respond to provide a fresh display frame. For instance, touching the area B (outside the sub-areas Ba, Bb and Bc) will result in a fresh display frame as shown in FIG. 3. This fresh display frame has the area B as its background and provides more comprehensive details as to which facility options are provided in the group of information facility options. These details are available in the original sub-areas Ba, Bb and Bc (which become areas in the fresh display frame), in a new area Bd, and in new sub-areas Baa and Bab which are nested in the area Ba. The new area Bd relates to the personal information in RAM, the new sub-area Baa relates only to the viewdata PRESTEL service, and the new sub-area Bab relates only to viewdata from at least one other data-base. Assuming that in the display frame of FIG. 3 the area Bb relating to the personal diary is touch-selected, a fresh display frame as shown in FIG. 4 will be produced. This fresh display frame has the area Bb as its background within which are four sub-areas Bba, Bbb, Bbc and Bbd, which relate respectively to "to-day", "this week", "last week" and "next week" of the personal diary. Touch-selection of the sub-area Bba will result in a final display frame, as illustrated in FIG. 5, which indicates that to-day's date facility of the personal diary is now available to the user.

The following TABLE II lists as a summary the various option groups, option sub-groups and individual options to which the different areas and sub-areas pertain, as mentioned above.

TABLE II

| Area or Sub-area | Option Group | Option Sub-Group | Individual Option |
| --- | --- | --- | --- |
| A | — | — | — |
| B | Information Services | — | — |
| C | Services | — | — |
| Ba | — | Viewdata | — |
| Bb | — | Personal Diary | — |
| Bc | — | Teletext | — |
| Bd | — | RAM Information | — |
| Baa | — | — | Viewdata-PRESTEL |
| Bab | — | — | Viewdata-other(s) |
| Bba | — | — | to-day's diary |
| Bbb | — | — | this week's diary |
| Bbc | — | — | last week's diary |
| Bbd | — | — | next week's diary |
| Ca | — | Personal Computer | — |
| Cb | — | Video Games | — |
| Cc | — | Video art | — |

These various option groups, option sub-groups and individual options can be identified in the different areas and sub-areas by a combination of text and graphics. Also, the different areas and sub-areas can be further distinguished from one another in shape, size and colour. An area would have the same colour, but possibly a change in both shape and size, in each of the display frames in which it appears. As regards the shape and size of an area, it is preferred to additionally provide each area with some characteristic feature, such as a cut-off corner, to indicate an active selection area. This would ensure that there is no confusion between other areas containing information and touch-selection areas. The selection process for selecting a desired facility option uses, in general, an improved selection technique in which successive touch-selections provide progressive detailing and display of available facility options towards a desired facility option. As one aspect of this improved selection technique, it has been found advantageous to touch-select directly from a group of options to a particular individual facility option of the group in an instance where the individual facility option is likely to be required much more frequently than the other facility options of the group. To achieve this direct touch-selection of an individual facility option, a sub-area pertaining to it is nested in the area for the relevant group of options in the initial display frame and also in each subsequent display frame, so that the individual facility option is available for selection directly from any one of the display frames. As an example of achieving such direct touch-selection, the sub-area Bba for the facility option of "to-day's diary" is nested in the area B within the sub-area Bb in the initial display frame shown in FIG. 2 for direct touch-selection. This sub-area Bba also appears nested in the area Bb in the display frame shown in FIG. 3 for direct touch-selection from that display frame also.

Another possible alternative in the display of facility options is represented by the dotted area Bbe in FIG. 4. This area Bbe is in respect of an extension of the Personal Diary and relates to, say, a recent year (e.g. 1980), with sub-areas such as Bbea and Bbeb within the area Bbe respectively relating to the months of the year. Thus, in response to touch-selection of the area Bbe, a fresh display frame which expands the year (1980) appropriately (e.g. into weeks) can be produced, while in response to touch-selection of a sub-area such as Bbea or Bbeb there can be produced a fresh display frame which expands the relevant month into days.

Practical considerations also dictate that each display frame (except the first) which the central processor 1 produces has a first control area CA, touch-selection of which causes the central processor 1 to replace the current display frame by the immediately preceding display frame, and a second control area CB, touch-selection of which causes the central processor 1 to replace the current display frame by the initial display frame.

Once a facility option has been selected and shown to be available by the final display frame, the keyboard 7 or the other interface apparatus 8 and 9 can be used, as appropriate, for the inter-active operation of the system by a user. It would, of course, also be possible to use the touch sensitive screen-device itself for such inter-active operation following the selection of certain of the facility options. For instance, in the case of the "viewdata-other(s)" facility option, the final display frame for that facility option could include a key pad for touch-tone dialling of a telephone number for a wanted data-base.

Since the writing tablet 8 and toggle or roller-ball 9 generate co-ordinate signals corresponding to any point on the screen of the television monitor 3, it would be possible to dispense with the touch sensitive screen device and to use instead one of these forms of interface apparatus to effect area selection for the selection of a desired facility option. However, this alternative mode of selection is not so simple as touch-selection as it involves providing on the screen a movable cursor which under the control of the interface apparatus is moved into an area to select the area. Another possible alternative is to provide a light-pen for the touch-selection.

Figure 6:
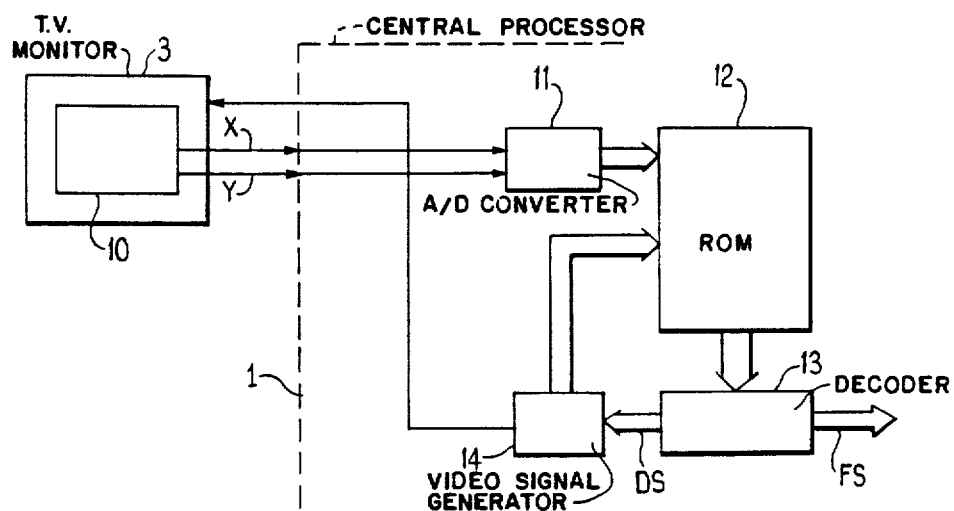
FIG. 6 shows diagrammatically certain elements of a central processor of the system of FIG. 1.

The central processor elements shown in FIG. 6 comprise an analogue-to-digital (A/D) converter 11, a read-only memory (ROM) device 12, a decoder 13 and a video signal generator 14. In response to co-ordinate signals on the leads X and Y from the touch sensitive screen device 10, the A/D converter 11 produces a first digital code which is fed to the ROM device 12 and identifies the point which has been touched on the screen. The video signal generator 14 feeds the video signal information for each display frame to the television monitor 3. The video signal generator 14 also feeds to the ROM device 12 a second digital code which identifies the current display frame on the television monitor 3. These first and second digital codes together identify a touched point of a particular display frame. The ROM device 12 functions as a "look-up" table and is responsive to these two codes to provide output data which represents a touched area on the screen for the displayed frame. This output data is fed to the decoder 13 which decodes this data to determine whether the touched area pertains to the final selection of a facility option, or whether the touched area pertains to a further stage in the facility option selection process. In the former case, the decoder 13 provides a "facility select" signal on the output FS to the facility concerned: in the latter case, the decoder 13 provides a "display frame select" signal on an output DS to identify to the video signal generator 14 the next display frame to be displayed.

As an alternative to the selection process performed by the elements shown in FIG. 6, the central processor 1 of the display system may be arranged to perform a different selection process which is under the control of a suitable software program: for the implementation of this software program the central processor 1 can be a commercially available microprocessor or microcomputer.

For the implementation of the software program, the following stored data would be available.

1. An area description for each area (including sub-areas) comprising:
    (a) X-start=the point on the X-ordinate of the display screen at which the area starts.
    (b) X-stop=the point on the X-ordinate of the display screen at which the area stops.
    (c) Y-start=the point on the Y-ordinate of the display screen at which the area starts.
    (d) Y-stop=the point on the Y-ordinate of the display screen at which the area stops.
    (e) ACTION=action to be taken if this area is selected
    (e.g. select a particular further display for the display frame).
    (f) LISTA=a list of area descriptions for the sub-areas (if any) nested within the instant area.
2. A frame description for each display frame comprising:
    (a) LISTF=a list of area descriptions for all the areas (including sub-areas) in the frame.

When a selection is made with the device 10, the X and Y co-ordinate signals which identify the touched point are compared with the X and Y start and stop data in each area description of the displayed frame. If for any area, $X \geq$ X-start and $X \leq$ X-stop, and $Y \geq$ Y-start and $Y \leq$ Y-stop, then the touched point is within that area. If the area has sub-areas within it, then the X and Y co-ordinate signals are compared in the same way with the X and Y start and stop data in the (sub)-areas description. Further nesting of sub-areas require further comparisons to be made in the same way. Once a final area or sub-area has been found the ACTION associated with it is executed.

The program steps for performing the above comparisons involve only known programming techniques, and a person skilled in the art would know readily how to provide these program steps given the above information. Also it will be apparent from the foregoing that a large number of different possible combinations of "nested" touch areas in a variety of display frames can be realised within the scope of the invention by suitable programming of the control processor.

I claim:

1. An information display system comprising:
    connection means for establishing selective connection between the display system and a number of different information sources to obtain information therefrom,
    a display device for the display of information obtained from said information sources,
    central processor means connected to said display device and said connection means for determining from which information source information is to be obtained and displayed,
    interface apparatus connected to said central processor means and operating under user control to generate and apply to said central processor means signals representing any selected point on a display area of the display device, and
    logic control means included in said central processor means causing the display on the display device of frames of available options which pertain to said information sources, said logic control means comprising:
        (a) means for producing, on initialization, a first display frame defining at least two discrete areas which are identified as pertaining to different facility options assigned to said areas, said first display frame further defining within at least one of said discrete areas at least one discrete sub-area which is identified as pertaining to one or more further facility options assigned to said sub-area,
        (b) means for producing a second display frame in response to the selection by said interface apparatus of a point which is within one of said areas but not within a sub-area of that area, said second display frame defining at least sub-areas which are identified as pertaining to different facility options assigned to said sub-areas, and
        (c) means for producing a third display frame in response to the selection by said interface apparatus of a point which is within a sub-area, said third display frame defining at least two discrete sub-sub-areas within said sub-area which are identified as pertaining to different facility options assigned to said sub-sub-areas, and if said selected area or sub-area pertains to a single facility option, providing a visual indication of the selection of that facility option,
    the logic control means then causing said central processor means to operate said connection means to establish connection to the information source pertaining to the selected facility option.

2. An information display system as claimed in claim 1, wherein the logic control means produces, when in said first display frame a selected sub-area pertains to a group of facility options assigned to said sub-area, a different alternative second display frame which defines a plurality of areas which pertain to respective facility options or to respective pluralities of facility options assigned to said areas.

3. An information display system as claimed in claim 2, wherein in said different alternative second display frame at least one of the areas which pertains to a plurality of facility options has defined within it at least one sub-area which pertains to a single facility option, or to a plurality of related facility options assigned to said sub-area.

4. An information display system as claimed in claim 1, wherein said interface apparatus is of a type which can generate coordinate signals to represent the coordinates of any selected point on the display area of the display device.

5. An information display system as claimed in claim 4, wherein said interface apparatus comprises a touch sensitive member device having a touch sensitive member which overlies the display area of the display device.

6. An information display system as claimed in claim 1, wherein said display device comprises a television monitor.

7. An information display system as claimed in claim 1, wherein the logic control means drives a video signal generator which provides video display signals such that the various areas, sub-areas and sub-sub-areas are made distinctive in colour and/or shape and/or size.

8. An information display system as claimed in claim 7, wherein said video display signals further define in respect of each active selection area the same characteristic features which indicate that the area is an active selection area.

9. An information display system as claimed in claim 1, wherein said second display frame includes at least one further area which is identified as pertaining to at least one facility option assigned to said area.

10. An information display system as claimed in claim 9, wherein in said second display frame at least one of said areas has defined within it at least one sub-area which is identified as pertaining to at least one facility option of said sub-area.

11. An information display system as claimed in claim 9, wherein said interface apparatus is of a type which can generate coordinate signals to represent the coordinates of any selected point on a display area of the display device.

12. An information display system as claimed in claim 9 wherein the logic control means drives a video signal generator which provides video display signals such that the various areas, sub-areas and sub-sub-areas are made distinctive in color and/or shape and/or size.

13. An information display system as claimed in claim 12, wherein said video display signals further define in respect of each active selection area the same characteristic feature which indicates that the area is an active selection area.

* * * * *